US009234741B2

(12) United States Patent  
Liang et al.

(10) Patent No.: US 9,234,741 B2  
(45) Date of Patent: Jan. 12, 2016

(54) INTERFEROMETRIC APPARATUS WITH COMPUTER-GENERATED HOLOGRAM FOR MEASURING NON-SPHERICAL SURFACES

(71) Applicant: DMetrix, Inc., Tucson, AZ (US)

(72) Inventors: Chen Liang, Tucson, AZ (US); Pixuan Zhou, Tucson, AZ (US)

(73) Assignee: DMETRIX, INC., Tuscon, AZ (US)

( * ) Notice: Subject to any disclaimer, the term of this patent is extended or adjusted under 35 U.S.C. 154(b) by 95 days.

(21) Appl. No.: 14/242,044

(22) Filed: Apr. 1, 2014

(65) Prior Publication Data

US 2015/0276374 A1    Oct. 1, 2015

(51) Int. Cl.
*G01B 9/02*    (2006.01)
*G01B 9/021*   (2006.01)
*G01B 11/24*   (2006.01)
*G01M 11/02*   (2006.01)

(52) U.S. Cl.
CPC ............ *G01B 9/021* (2013.01); *G01B 9/02039* (2013.01); *G01B 9/02057* (2013.01); *G01B 11/2441* (2013.01); *G01M 11/02* (2013.01)

(58) Field of Classification Search
CPC ........... G01N 11/2441; G01B 9/02021; G01B 9/02023; G01B 9/02039; G01B 9/02097
USPC .................................. 356/457, 521, 512, 513
See application file for complete search history.

(56) References Cited

U.S. PATENT DOCUMENTS

| | | | | |
|---|---|---|---|---|
| 7,006,234 B1* | 2/2006 | Cottrell | .................... | G01J 9/02 |
| | | | | 356/495 |
| 7,605,926 B1* | 10/2009 | Hetzler | ............ | G01M 11/0221 |
| | | | | 356/515 |
| 2009/0128829 A1* | 5/2009 | Schillke | ............ | G01B 11/2441 |
| | | | | 356/521 |
| 2015/0198438 A1* | 7/2015 | Hetzler | ............ | G01B 9/02028 |
| | | | | 359/15 |

* cited by examiner

*Primary Examiner* — Jonathan Hansen
(74) *Attorney, Agent, or Firm* — Yakov Sidorin; Quarles & Brady LLP (57) ABSTRACT

Method and system of interferometrically measuring, in reflection, a non-spherical surface with two diffracted beams (of different diffraction orders) formed by a diffractive element positioned transversely to the axis of a common-path interferometer. The first diffracted beam substantially maintains the wavefront of a beam incident onto the diffractive element, while the second diffracted beam has a wavefront profile corresponding to the profile of the measured surface. The first diffracted beam may be reflected by the surface in a cat's eye configuration, while the second diffracted beam is reflected by the surface in a confocal configuration. The surface being measured can be modified to substantially balance radiant powers of the first and second diffracted beams upon reflection off the surface.

21 Claims, 6 Drawing Sheets

INTERFEROMETRIC APPARATUS WITH COMPUTER-GENERATED HOLOGRAM FOR MEASURING NON-SPHERICAL SURFACES

TECHNICAL FIELD

The present invention relates to testing of optical components with aspherical surfaces and, more particularly, to testing involving common-path interferometry with a diffractive element traversed by test and reference beams more than once.

SUMMARY OF THE INVENTION

Embodiments of the invention provide a method for interferometric testing of a non-spherical surface. Such method includes reflecting first and second beams of light (that have been formed by a diffractive element from an input beam of light with an input beam wavefront, that is incident onto the diffractive element along an optical axis) with the SUT to form first and second reflected beams that satisfy certain criteria. In particular, the first and second reflected beams are formed such that: (i) characteristics of a first wavefront corresponding to the first reflected beam are the same as characteristics of the input beam wavefront, and (ii) characteristics of a second wavefront corresponding to the second reflected beam include characteristics of the input beam wavefront that have been modified by interaction of said input beam with the SUT. The first and second beams are formed either in transmission of the input beam through the diffractive element or in reflection of the input beam wavefront from the diffractive element. The method further includes determining, with the use of a control unit that includes a specifically programmed processor, a non-spherical profile of the SUT based on optical data that have been derived from a distribution of irradiance formed, with the use of an interferometer, by coaxially propagating first and second reflected beams. The step of reflecting may include reflecting first and second beams that respectively correspond to two different diffraction orders formed by the diffractive element from the input beam and, in particular, it may include reflecting the first beam from the SUT in a cat's eye configuration and reflecting the second beam from the SUT in a confocal configuration.

In a specific case, the step of reflecting may include reflecting the first beam that converges towards a first point of intersection of the optical axis with the SUT and reflecting the second beam that converges towards a second point. The first and second points are generally different and, in particular, may be located on an axis along which the first and second beams propagate. In a specific case, the second point is located between the diffractive element and the first point. Alternatively or in addition, the step of reflecting may include reflecting the first beam that has a spherical wavefront and reflecting the second beam having a wavefront a profile of which corresponds to the profile of the SUT. Alternatively or in addition, spatial distribution of reflectivity of the SUT can be modified independently attenuate the first and second reflected beams 9 for example, to maintain a known different between radiant powers corresponding to the first and second reflected beams). In a specific case, the spatial distribution of reflectivity of the SUT is modified to substantially match radiant power of the first reflected beam with radiant power of the second reflected beam.

Embodiments of the invention further provide a common-path interferometer system. In one implementation, the system includes a diffractive element positioned in the path of input beam of light incident thereon from the object space. The diffractive element is structured to form a first beam of light (upon interaction of the diffractive element with the input beam), which corresponds to a first chosen diffraction order; and to form a second beam of light (upon interaction of the diffractive element with the input beam), which corresponds to a second chosen diffraction order, such that the first beam of light converges to a first point on the axis and the second beam of light converges towards a second point on the axis, the first point and second point being different. In a related implementation, the system includes first and second lenses disposed co-axially with respect to an axis, the first lens collimating an input beam to form a collimated beam and the second lens converting the collimated beam into a converging beam. The system further includes a diffractive element positioned next to the second lens in the image space. The diffractive element is specifically structured (i) to form a first beam of light corresponding to a first diffraction order upon interaction of the diffractive element with an input beam of light propagating, from the object space, through the first and second lenses, and (ii) to form a second beam of light by relaying a portion of the input beam to the image space. The first and second beams are formed such that the first beam converges to a first point on the axis and said second beam of light converges towards a second point on the axis, where the first point is located between the diffractive element and the second point. In a specific embodiment, the system is structured such that the second beam (upon reflection by a reflector a reflecting surface of which is positioned perpendicularly to the axis such as to pass through the second point) forms a reference beam of the system, and the first beam (upon reflection by such reflector) forms a test beam of said interferometer system. A system may additionally include an optical detector positioned to intersect the test and reference beams and to produce an output representative of interference fringes formed by the first and second beams at a surface of the optical detector. The system can further include a control unit having a processor in operable communication with the optical detector and tangible, non-transitory medium containing program code that governs the operation of the processor to determine a profile of a wavefront of the test beam based on the data output from the detector.

BRIEF DESCRIPTION OF THE DRAWINGS

The invention will be more fully understood by referring to the following Detailed Description in conjunction with the generally not-to scale Drawings, of which:

FIG. 5A, 5B provide diagrams of modified embodiments of the invention in which power of at least one of the two diffracted beams is modified upon reflection form the optical component under test. FIG. 5A: diffracted beam giving rise to the reference beam of the interferometer can be attenuated by apply partially reflective coating over a small area around where such beam reflects off the test surface. FIG. 5B: diffracted beam giving rise to the test beam can be attenuated by apply partially reflective coating over the test surface minus the small area around where the reference beam reflects off the test surface;

DETAILED DESCRIPTION

Laser interferometers are often used for measurements of shapes of surfaces of high-precision optical elements. The measurement methodology involved interfering a test beam (which has a wavefront specifically generated to match a surface under test, SUT) with a reference beam (which typically has an un-aberrated spherical wavefront). For characterizing a spherical SUT or a flat SUT, the wavefront of a test beam can be, understandably, easily generated. For measuring non-spherical surfaces, however, generating an appropriate test beam wavefront can be rather challenging. One method of generating a test beam wavefront required for characterization of aspherical and/or free-form SUTs is the use of a computer generated hologram (CGH). A CGH can be designed and fabricated to introduce substantially any arbitrary wavefront (within a range of wavefront slopes limited by diffraction of light and capabilities of fabrication of the CGH).

The idea of the present invention stems from the realization that both the test and reference beams for testing a non-spherical surface (such as an aspherical surface, or a free-form surface) can be generated by the same, single CGH element positioned in an interferometric set-up in which the test and reference arms of the set-up not only are co-axial but also co-located in space, thereby resulting in a single-arm non-spherical surface test interferometer. To achieve this, the test and reference beams are formed, in one implementation, as different orders of diffraction, at the CHG, of the incident beam illuminating the CGH. Accordingly, a novel class of diffractive-element-containing interferometers and methods of optical-surface testing are provided.

Figure 1:
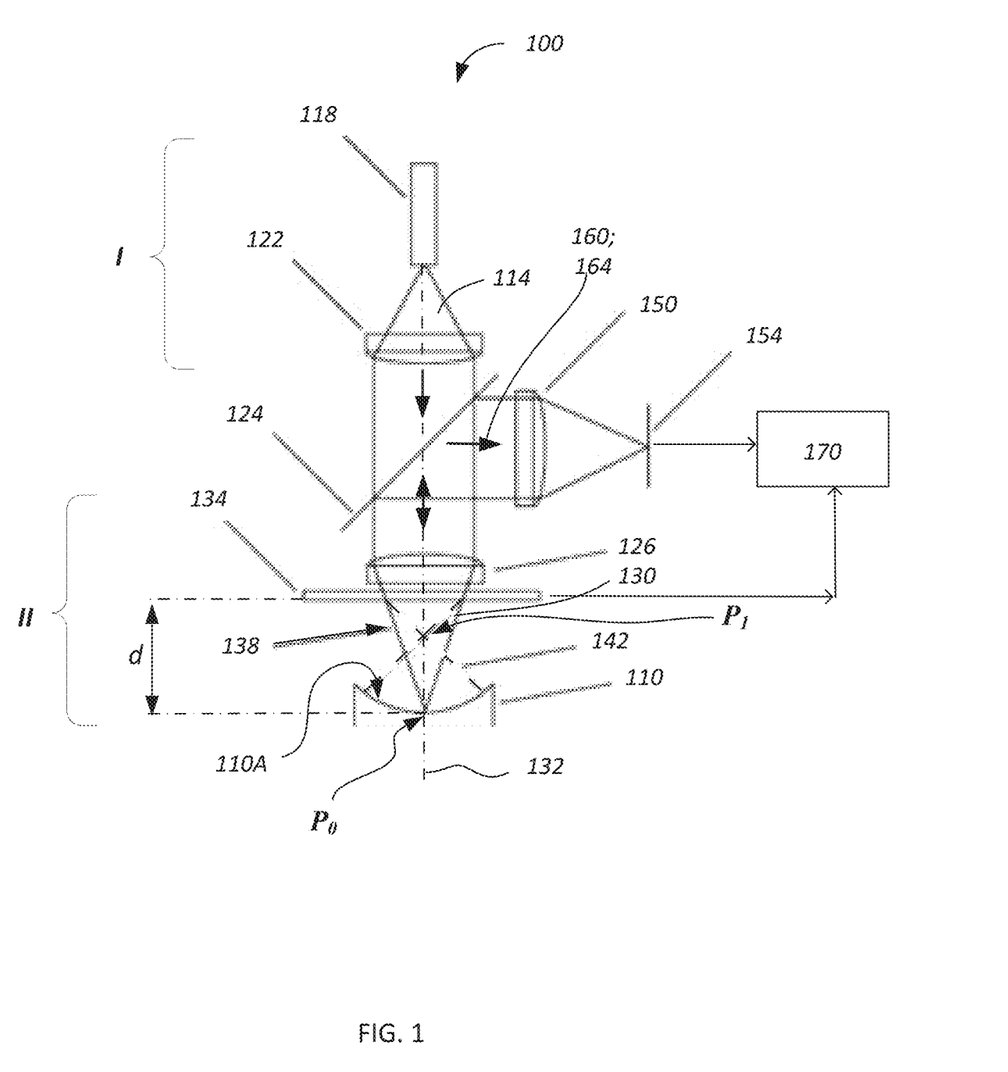
FIG. 1 is a schematic of an embodiment of the interferometer of the invention (as shown—with a concave aspheric surface under test)

FIG. 1 illustrates schematically an embodiment 100 of a single-arm interferometric set-up and method of the invention. To test a profile of a non-spherical SUT 110A of an optical element 110 (such as an aspherical lens, for example), a collimated beam of light 114 at a wavelength λ, originated from a coherent optical source (in one implementation—a laser 118) is used. The beam 114 is collimated from a spatially-diverging light distribution using a collimating optical system 122 (which may contain a lens and/or a mirror, but which is referred to, for simplicity, as a collimating lens). Upon collimation, the beam is further directed to and transmitted through a beamsplitter 124 and a wavefront-converging (for example, focusing) optical system 126 (referred to for, simplicity, as a focusing lens) to form a spatially-converging beam 130 that has a substantially spherical wavefront propagating along an optical axis 132. For the purposes of this disclosure, space I preceding the collimating lens 122 is referred to as object space and space II following the focusing lens 126 is referred to as image space. The converging beam 130 is further transmitted through a diffractive element 134 positioned preferably in close proximity to the focusing lens 126. In one embodiment, the diffractive element 134 includes a computer-generated hologram CGH (such as an optically-transmissive phase plate) structured to produce, in transmission of a spherical wavefront incident on it, multiple diffractive orders.

As illustrated in the example of FIG. 1, two diffraction orders of light passing through the CGH 134 are used: a zeroth order (shown in solid lines) and a first order (shown in dashed lines). Depending on the particularities of the set-up, other diffraction orders are suppressed or simply ignored and/or blocked in operation (as will become apparent from the discussion below). The wavefront of the zeroth diffractive order beam 138 (that, as a skilled artisan would recognize, is a portion of the beam 130 the propagation of which is not modified by diffraction upon passing through the element 134) retains the characteristics of the wavefront of the beam 130 and remains substantially spherical. At the same time, the CGH is structured to ensure that the beam 142, corresponding to the first order of diffraction of the beam 130, has a wavefront to spatially match the SUT 110A. The positioning and orientation of the SUT 110A in the set-up 100 is such that the SUT 110A substantially matches the wavefront of the test beam 142. Accordingly, the $0^{th}$ diffractive order beam 138, which converges towards an axial point $P_0$ on the SUT 110A, is at least partially reflected back by the SUT 110A in a cat's eye configuration and propagated back along the axis 132 towards the beamsplitter 124 of the system 100 and further through a lens 150 towards an optical detection system 154, (as known in the art, the term "cat's eye" refers to a configuration of a retroreflector that includes a lens with a reflecting surface located near its focus.) The back-reflected portion of the $0^{th}$ diffraction order beam 138 is used as a reference beam 160 in the interferometer 100. Upon such propagation, the reference beam 160 traverses the diffractive element 134 in reverse without deviation of the direction of propagation and/ or modification of its spherical wavefront due to diffraction.

The $1^{st}$ diffractive order beam 142, on the other hand, is reflected at least in part by the test surface 110A in a confocal configuration and directed back (in a −z direction, as shown) to the beamsplitter 124 through the diffractive element 134 and the lens 126. Upon the traversal of the diffractive element 134 in reverse (towards the lens 126), the reflected portion of the beam 142 is diffracted again. Beam wavefront(s) propagating through the CGH 134 in reverse (along −x-axis) are affected by the CGH 134 in a fashion substantially equal to that of the modification caused due to the propagation through the CGH 134 along the +x-axis, but with the opposite sign. Upon propagation through the lens 126 and reflection off of the beamsplitter 124 towards the detection system 154, the test beam is labeled as beam 164.

At the optical detection system 154, the fringe pattern produced by interference between wavefronts corresponding to the test and reference beams is imaged onto an electronic image sensor. Upon the acquisition/detection of the irradiance distribution corresponding to the interference fringes, the detector 150 generates output data further communicated to the data-processing circuitry 170 (which may include a computer processor appropriately programmed with data analysis program code) to derive a descriptor of the test surface's spatial profile. The detection system or image sensor 150 may include a two-dimensional (2D) CCD or CMOS image sensor. It is appreciated that, in operation, the dynamic range of an embodiment of the interferometer is in part limited by the image sensor's ability to spatially resolve the interferometric fringes and, for this reason, it is preferred to use an image sensor having a large number of pixels.

Preferably, the diffractive element 134 is structured to introduce optical power to a chosen one of the co-lineally propagating diffraction order beams to spatially distinguish and/or separate such chosen beam from the rest of diffraction order beam(s). In the example of FIG. 1, the CGH 134 adds optical power to the $1^{st}$ diffraction order beam 142 and not to the $0^{th}$ diffraction order beam 138, as a result of which the beam 138 converges to a point $P_1$ located closer to the focusing lens than the point $P_0$. It is appreciated that, as a combination of optical elements, the focusing lens 126 and the diffractive element 134 should preferably be designed in such a way that a spherical aberration, introduced into a beam traversing the body of the diffractive element 134, and that introduced into the same beam by the focusing lens 125 cancel each other. Alternatively, an appropriate computational correction may be required at a step of optical data processing with the circuitry 170.

The advantageous operation of the single-arm interferometer structure according to the idea of the invention was demonstrated by measuring three optical surfaces: 1) a concave conic surface, 2) a concave high-even-order aspheric surface and 3) a convex conic surface. The following description of the test set-ups is complemented with optical prescription data produced by ZEMAX® optical design software.

Example #1

Figure 2A:
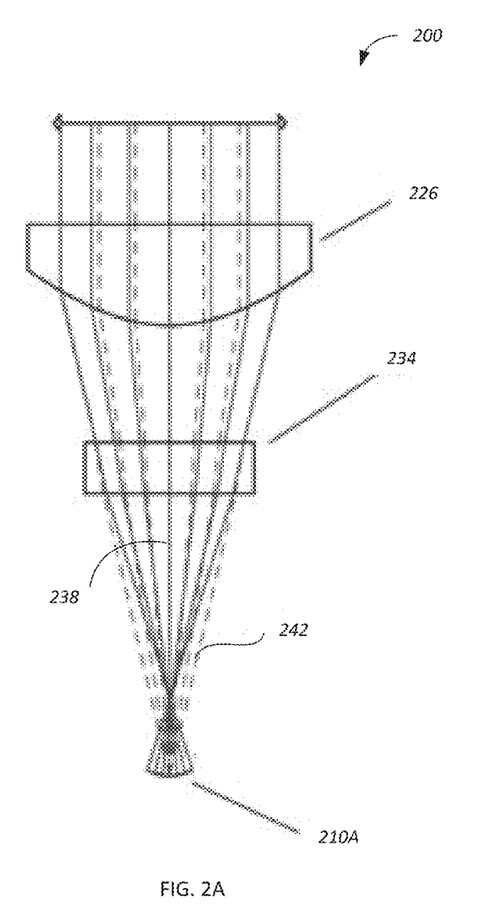
FIG. 2A shows a portion of a test set-up for measuring a surface of Example #1.
Figure 2B:
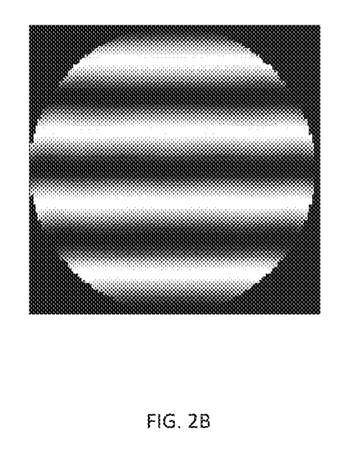
FIG. 2B is an interferogram produced with the embodiment of FIG. 2A, as a result of the measurement of the surface of Example #1, in which a null fringe is acquired and tilt fringes are added for illustration purposes.

Referring now to FIG. 2A and in further reference to FIG. 1, the testing of a concave conic surface 210A was performed with the use of a test set-up structured according to the structure of the embodiment 100. For simplicity of illustration, FIG. 2A illustrates of only a portion 200 of such test set-up, including the focusing lens 226 and the CGH 234. The profile of a concave conic surface 210A is provided in Table 1.1. FIG. 2B presents an interferogram produced with the embodiment of FIG. 2A, as a result of the measurement of the surface of Example #1, in which a null fringe is acquired and tilt fringes are added for illustration purposes.

TABLE 1.1

Description of a concave conic surface 210A under test.

| | Radius of Curvature | Conic Constant | Diameter |
|---|---|---|---|
| Example #1 | 1.871 mm | −2.82 | 1.6 mm |

The CGH 234 forms a first diffraction order beam 242 give rise to the test-beam wavefront and the $0^{th}$ diffraction order beam 238 to provide for the reference-beam wavefront. The CGH 234 was modeled in ZEMAX® using a Binary2 surface type. The design parameters for the CGH 234 are shown in Table 1.2.

TABLE 1.2

Description of the CGH 234 used for testing of surface 210A.

| Norma Radius | Coeff on $p\hat{\ }2$ | Coeff on $p\hat{\ }4$ | Coeff on $p\hat{\ }6$ |
|---|---|---|---|
| 2.62 mm | −900.486 | −24.548 | 26.429 |

Example #2

Figure 3A:
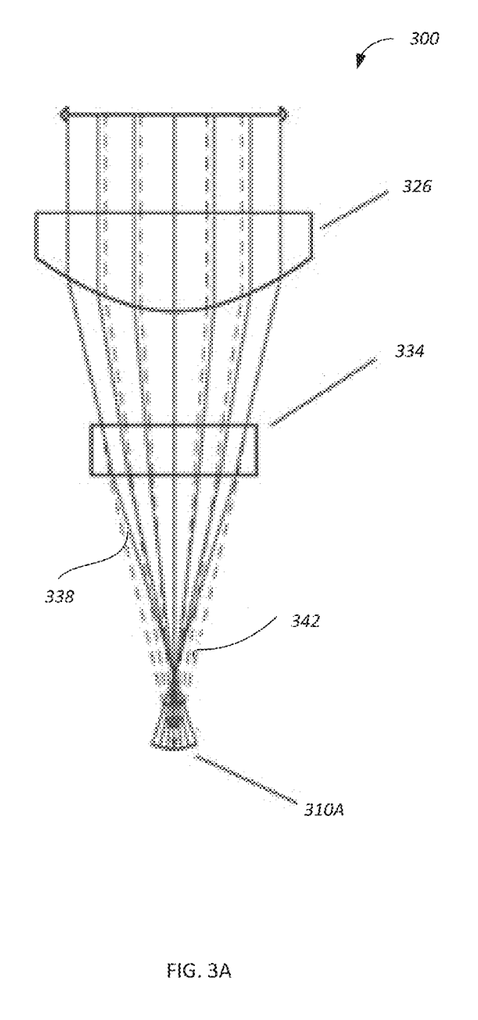
FIG. 3A shows a portion of a test set-up for measuring a surface of Example #2.

FIG. 3A illustrate a portion 300 of an optical layout of a test set-up (generally structured according to the idea of the embodiment 100) for testing of a concave high order even aspheric surface 310A. The profile parameters of the surface 310 are provided in Table 2.1.

TABLE 2.1

Description of a concave high-even-order aspheric surface 310A under test.

| | Radius of Curvature | $6^{th}$ order term | $8^{th}$ order term | $10^{th}$ order term | $12^{th}$ order term | Diameter |
|---|---|---|---|---|---|---|
| Example #2 | 2.5 mm | 0.01 | 0.007 | −0.004 | 0.003 | 1.6 mm |

Figure 3B:
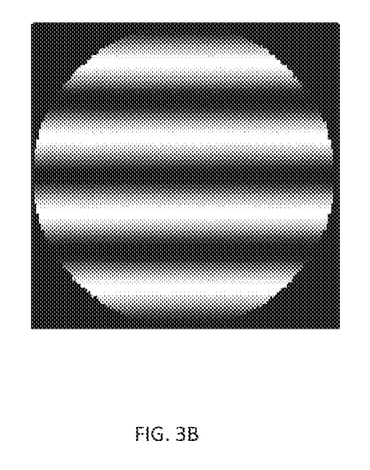
FIG. 3B is an interferogram produced with the embodiment of FIG. 3A, as a result of the measurement of the surface of Example #2, in which a null fringe is acquired and tilt fringes are added for illustration purposes.

In FIG. 3A, only the focusing lens 326 and the CGH 334 of the interferometer of the invention are shown for the simplicity of illustration. As in related embodiments, the first diffraction order beam 342 is used to produce a test beam with a test wavefront, while the $0^{th}$ diffraction order beam 338 is used to produce a reference beam with the reference wavefront. The CGH 334 was modeled with ZEMAX® a Binary2 surface type. The design parameters for the CGH 334 are shown in Table 2.2. FIG. 3B presents an interferogram produced with the embodiment of FIG. 3A, as a result of the measurement of the surface of Example #2, in which a null fringe is acquired and tilt fringes are added for illustration purposes

TABLE 2.2

Description of the CGH 334 used for testing of surface 310A.

| Normal Radius | Coeff on $p\hat{\ }2$ | Coeff on $p\hat{\ }4$ | Coeff on $p\hat{\ }6$ | Coeff on $p\hat{\ }8$ |
|---|---|---|---|---|
| 2.62 mm | −1310.026 | 102.739 | 62.913 | −27.884 |

Figure 4A:
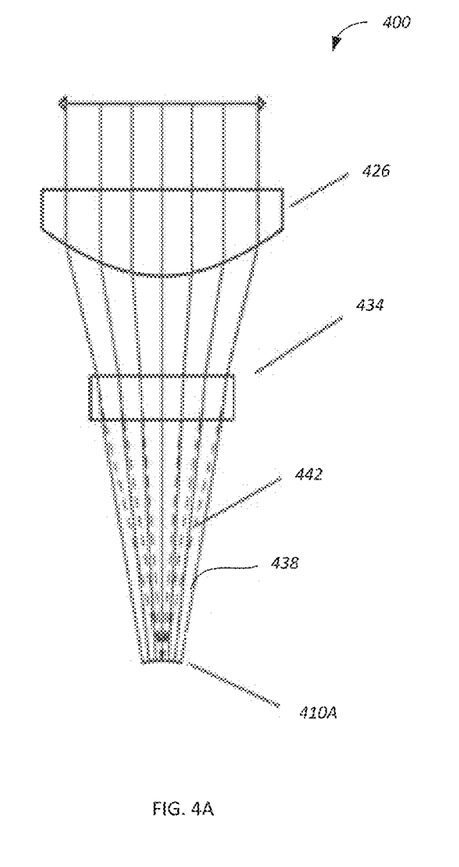
FIG. 4A shows a portion of a test set-up for measuring a surface of Example #3.
Figure 4B:
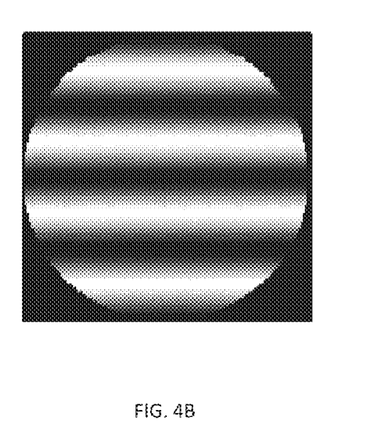
FIG. 4B is an interferogram produced with the embodiment of FIG. 4A, as a result of the measurement of the surface of Example #3, in which a null fringe is acquired and tilt fringes are added for illustration purposes.

Example #3 illustrates, in reference to FIGS. 4A, 4B and FIG. 1, the testing of a convex aspheric surface 410A. The surface 410 profile is provided with data of Table 3.1.

TABLE 3.1

Description of a convex aspheric surface 410A under test.

| | Radius of Curvature | Conic Constant | Diameter |
|---|---|---|---|
| Example #3 | 4 mm | −0.5 | 1.6 mm |

In a portion 400 of the interferometric set-up of the invention structured according to the idea presented in reference to FIG. 1, only the focusing lens 426 and the CGH 434 are shown for the simplicity of illustration. The first diffraction order beam 442 is used to form a test beam, while the $0^{th}$ diffraction order beam 438 is used to form a reference beam. The CGH 434 is modeled in ZEMAX® using a Binary2 surface type. The design parameters for the CGH 434 are presented in Table 3.2.

TABLE 3.2

Description of the CGH 434 used for testing of surface 410A.

| Normal Radius | Coeff on $p\hat{\ }2$ | Coeff on $p\hat{\ }4$ | Coeff on $p\hat{\ }6$ |
|---|---|---|---|
| 2.62 mm | 1080.926 | −44.175 | 6.441 |

Prescription data used for modeling structures of the systems of FIG. 2A, 3A, 4A with Zemax® are summarized, accordingly, in Tables 4.1, 4.2, 4.3 (below).

TABLES 4.1

ZEMAX Prescription Data for the System of FIG. 2A

| Surf | Type | Radius | Thickness | Glass | Diameter | Conic | Comment |
|---|---|---|---|---|---|---|---|
| OBJ | STANDARD | Infinity | Infinity | | | 0 | 0 |
| 1 | PARAXIAL | — | 5 | | 2.789192 | — | |
| 2 | STANDARD | Infinity | 0 | | 4.440892e−016 | 0 | |
| | | | 1.000000, | | | | |
| 3 | STANDARD | 1.871 | 8.371 | | 1.6 | −2.82 | TEST SURF |
| 4 | STANDARD | Infinity | 0 | | 4.669664 | 0 | |
| 5 | STANDARD | Infinity | 1.52 | SILICA | 6 | 0 | CGH GLASS SUB |
| STO | BINARY_2 | Infinity | 0 | | 5.24 | 0 | CGH |
| 7 | STANDARD | Infinity | 3.48 | | 5.24 | 0 | |
| 8 | STANDARD | 6.641382 | 3 | BK7 | 10 | −2.285648 | REFERENCE SPHERE |
| 9 | STANDARD | Infinity | 3 | | 7.755547 | 0 | |
| 10 | PARAXIAL | — | 75 | | 7.755489 | — | |
| IMA | STANDARD | Infinity | | | 0.0014478 | 0 | |

SURFACE DATA DETAIL:

| | |
|---|---|
| Surface OBJ | STANDARD |
| Surface 1 | PARAXIAL |
| Focal length | 5 |
| OPD Mode | 1 |
| Surface 2 | STANDARD |
| Surface 3 | STANDARD TEST SURF |
| Aperture | Floating Aperture |
| Maximum Radius | 0.8 |
| Surface 4 | STANDARD |
| Surface 5 | STANDARD CGH GLASS SUB |
| Aperture | Floating Aperture |
| Maximum Radius | 3 |
| Surface STO | BINARY_2 CGH |
| Diffraction Order | 0 |
| Coefficient on $r^2$ | 0 |
| Coefficient on $r^4$ | 0 |
| Coefficient on $r^6$ | 0 |
| Coefficient on $r^8$ | 0 |
| Coefficient on $r^{10}$ | 0 |
| Coefficient on $r^{12}$ | 0 |
| Coefficient on $r^{14}$ | 0 |
| Coefficient on $r^{16}$ | 0 |
| Maximum term # | 3 |
| Normalization Radius | 2.62 |
| Coefficient on $p^2$ | −900.48572 |
| Coefficient on $p^4$ | −24.548477 |
| Coefficient on $p^6$ | −26.429155 |
| Aperture | Floating Aperture |
| Maximum Radius | 2.62 |
| Surface 7 | STANDARD |
| Surface 8 | STANDARD REFERENCE SPHERE |
| Aperture | Floating Aperture |
| Maximum Radius | 5 |
| Surface 9 | STANDARD |
| Surface 10 | PARAXIAL |
| Focal length | 75 |
| OPD Mode | 0 |
| Surface IMA | STANDARD |

MULTI-CONFIGURATION DATA:

Configuration 1:

| | | | | |
|---|---|---|---|---|
| 1 | Param | 0 | 6 | 0 |
| 2 | Stop Surf | 6 | | |
| 3 | Param | 1 | 1 | 5 |
| 4 | Model Nd | 2 | 1 | |
| 5 | Comment | | | |

Configuration 2:

| | | | | |
|---|---|---|---|---|
| 1 | Param | 0 | 6 | 1 |
| 2 | Stop Surf | 3 | | |
| 3 | Param | 1 | 1 | 0 |
| 4 | Model Nd | 2 | 0 | |
| 5 | Comment | | | |

INDEX OF REFRACTION DATA:

TABLES 4.1-continued

ZEMAX Prescription Data for the System of FIG. 2A

| Surf | Glass | Temp | Pres | 0.632800 |
|---|---|---|---|---|
| 0 |  | 20.00 | 1.00 | 1.00000000 |
| 1 |  | 20.00 | 1.00 | 1.00000000 |
| 2 | <MODEL> | 20.00 | 1.00 | 1.00000000 |
| 3 |  | 20.00 | 1.00 | 1.00000000 |
| 4 |  | 20.00 | 1.00 | 1.00000000 |
| 5 | SILICA | 20.00 | 1.00 | 1.45701793 source: Handbook of Optics Vol. II |
| 6 |  | 20.00 | 1.00 | 1.00000000 |
| 7 |  | 20.00 | 1.00 | 1.00000000 |
| 8 | BK7 | 20.00 | 1.00 | 1.51508920 |
| 9 |  | 20.00 | 1.00 | 1.00000000 |
| 10 |  | 20.00 | 1.00 | 1.00000000 |
| 11 |  | 20.00 | 1.00 | 1.00000000 |

System Temperature: 20.0000 Celsius
System Pressure: 1.0000 Atmospheres
Absolute air index: 1.000272 at wavelength 0.632800 μm
Index data is relative to air at the system temperature and pressure.
Wavelengths are measured in air at the system temperature and pressure.

THERMAL COEFFICIENT OF EXPANSION DATA:

| Surf | Glass | TCE *10E−6 |
|---|---|---|
| 0 |  | 0.00000000 |
| 1 |  | 0.00000000 |
| 2 | <MODEL> | 0.00000000 |
| 3 |  | 0.00000000 |
| 4 |  | 0.00000000 |
| 5 | SILICA | 0.51000000 source: Handbook of Optics Vol. II |
| 6 |  | 0.00000000 |
| 7 |  | 0.00000000 |
| 8 | BK7 | 7.10000000 |
| 9 |  | 0.00000000 |
| 10 |  | 0.00000000 |
| 11 |  | 0.00000000 |

TABLES 4.2

ZEMAX Prescription Data for the System of FIG. 3A

SURFACE DATA SUMMARY:

| Surf | Type | Radius | Thickness | Glass | Diameter | Conic | Comment |
|---|---|---|---|---|---|---|---|
| OBJ | STANDARD | Infinity | Infinity |  | 0 | 0 |  |
| 1 | PARAXIAL | — | 5 |  | 1.6 | — |  |
| 2 | STANDARD | Infinity | 0 0.000000 | 0.000000 | 1.6 | 0 |  |
| STO | EVENASPH | 2.5 | 8.371 |  | 1.6 | 0 | TEST SURF |
| 4 | STANDARD | Infinity | 0 |  | 4.448662 | 0 |  |
| 5 | STANDARD | Infinity | 1.52 | SILICA | 6 | 0 | CGH GLASS SUB |
| 6 | BINARY_2 | Infinity | 0 |  | 5.24 | 0 | CGH |
| 7 | STANDARD | Infinity | 3.48 |  | 5.18889 | 0 |  |
| 8 | STANDARD | 6.641382 | 3 | BK7 | 10 | −2.285648 | REFERENCE SPHERE |
| 9 | STANDARD | Infinity | 3 |  | 7.666807 | 0 |  |
| 10 | PARAXIAL | — | 75 |  | 7.666413 | — |  |
| IMA | STANDARD | Infinity | 0.009853559 |  | 0 | 0 |  |

SURFACE DATA DETAIL:

| | |
|---|---|
| Surface OBJ | STANDARD |
| Surface 1 | PARAXIAL |
| Focal length | 0 |
| OPD Mode | 1 |
| Surface 2 | STANDARD |
| Surface STO | EVENASPH TEST SURF |
| Coefficient on $r^2$ | 0 |
| Coefficient on $r^4$ | 0 |
| Coefficient on $r^6$ | 0.01 |
| Coefficient on $r^8$ | 0.0075 |

TABLES 4.2-continued

ZEMAX Prescription Data for the System of FIG. 3A

| | |
|---|---|
| Coefficient on r^10 | −0.004 |
| Coefficient on r^12 | 0.0025 |
| Coefficient on r^14 | 0 |
| Coefficient on r^16 | 0 |
| Aperture | Floating Aperture |
| Maximum Radius | 0.8 |
| Surface 4 | STANDARD |
| Surface 5 | STANDARD CGH GLASS SUB |
| Aperture | Floating Aperture |
| Maximum Radius | 3 |
| Surface 6 | BINARY_2 CGH |
| Diffraction Order | 1 |
| Coefficient on r^2 | 0 |
| Coefficient on r^4 | 0 |
| Coefficient on r^6 | 0 |
| Coefficient on r^8 | 0 |
| Coefficient on r^10 | 0 |
| Coefficient on r^12 | 0 |
| Coefficient on r^14 | 0 |
| Coefficient on r^16 | 0 |
| Maximum term # | 4 |
| Normalization Radius | 2.62 |
| Coefficient on r^2 | −1310.0256 |
| Coefficient on r^4 | 102.73927 |
| Coefficient on r^6 | 62.913249 |
| Coefficient on r^8 | −27.88422 |
| Aperture | Floating Aperture |
| Maximum Radius | 2.62 |
| Surface 7 | STANDARD |
| Surface 8 | STANDARD REFERENCE SPHERE |
| Aperture | Floating Aperture |
| Maximum Radius | 5 |
| Surface 9 | STANDARD |
| Surface 10 | PARAXIAL |
| Focal length | 75 |
| OPD Mode | 0 |
| Surface IMA | STANDARD |

MULTI-CONFIGURATION DATA:

Configuration 1:

| | | | |
|---|---|---|---|
| 1 | Param 0 | 6 | 0 |
| 2 | Stop Surf | | 6 |
| 3 | Param 1 | 1 | 5 |
| 4 | Model Nd | 2 | 1 |
| 5 | Comment | | |

Configuration 2:

| | | | |
|---|---|---|---|
| 1 | Param 0 | 6 | 1 |
| 2 | Stop Surf | | 3 |
| 3 | Param 1 | 1 | 0 |
| 4 | Model Nd | 2 | 0 |
| 5 | Comment | | |

INDEX OF REFRACTION DATA:

| Surf | Glass | Temp | Pres | 0.632800 |
|---|---|---|---|---|
| 0 | | 20.00 | 1.00 | 1.00000000 |
| 1 | | 20.00 | 1.00 | 1.00000000 |
| 2 | <MODEL> | 20.00 | 1.00 | 0.00000000 |
| 3 | | 20.00 | 1.00 | 1.00000000 |
| 4 | | 20.00 | 1.00 | 1.00000000 |
| 5 | SILICA | 20.00 | 1.00 | 1.45701793 source: Handbook of Optics Vol. II |
| 6 | | 20.00 | 1.00 | 1.00000000 |
| 7 | | 20.00 | 1.00 | 1.00000000 |
| 8 | BK7 | 20.00 | 1.00 | 1.51508920 |
| 9 | | 20.00 | 1.00 | 1.00000000 |
| 10 | | 20.00 | 1.00 | 1.00000000 |
| 11 | | 20.00 | 1.00 | 1.00000000 |

System Temperature: 20.0000 Celsius
System Pressure: 1.0000 Atmospheres
Absolute air index: 1.000272 at wavelength 0.632800 μm
Index data is relative to air at the system temperature and pressure.
Wavelengths are measured in air at the system temperature and pressure.

TABLES 4.2-continued

ZEMAX Prescription Data for the System of FIG. 3A

THERMAL COEFFICIENT OF EXPANSION DATA:

| Surf | Glass | TCE *10E−6 |
|---|---|---|
| 0 | | 0.00000000 |
| 1 | | 0.00000000 |
| 2 | <MODEL> | 0.00000000 |
| 3 | | 0.00000000 |
| 4 | | 0.00000000 |
| 5 | SILICA | 0.51000000 |
| | | source: Handbook of Optics Vol. II |
| 6 | | 0.00000000 |
| 7 | | 0.00000000 |
| 8 | BK7 | 7.10000000 |
| 9 | | 0.00000000 |
| 10 | | 0.00000000 |
| 11 | | 0.00000000 |

TABLES 4.3

ZEMAX Prescription Data for the System of FIG. 4A

SURFACE DATA SUMMARY:

| Surf | Type | Radius | Thickness | Glass | Diameter | Conic | Comment |
|---|---|---|---|---|---|---|---|
| OBJ | STANDARD | Infinity | Infinity | | 0 | 0 | |
| 1 | PARAXIAL | — | 5 | | 1.6 | — | |
| 2 | STANDARD | Infinity | 0 | 0.000000, 0.000000 | 1.6 | 0 | |
| STO | EVENASPH | −4 | 8.371 | | 1.6 | −0.5 | TEST SURF |
| 4 | STANDARD | Infinity | 0 | | 4.971256 | 0 | |
| 5 | STANDARD | Infinity | 1.52 | SILICA | 6 | 0 | CGH GLASS SUB |
| 6 | BINARY_2 | Infinity | 0 | | 5.4 | 0 | CGH |
| 7 | STANDARD | Infinity | 3.48 | | 5.383096 | 0 | |
| 8 | STANDARD | 6.641382 | 3 | BK7 | 10 | −2.285648 | REFERENCE SPHERE |
| 9 | STANDARD | Infinity | 3 | | 8.000129 | 0 | |
| 10 | PARAXIAL | — | 75 | | 7.999452 | — | |
| IMA | STANDARD | Infinity | | 0.01692899 | 0 | | |

SURFACE DATA DETAIL:

| | |
|---|---|
| Surface OBJ | STANDARD |
| Surface 1 | PARAXIAL |
| Focal length | 0 |
| OPD Mode | 1 |
| Surface 2 | STANDARD |
| Surface STO | EVENASPH TEST SURF |
| Coefficient on $r^2$ | 0 |
| Coefficient on $r^4$ | 0 |
| Coefficient on $r^6$ | 0 |
| Coefficient on $r^8$ | 0 |
| Coefficient on $r^{10}$ | 0 |
| Coefficient on $r^{12}$ | 0.0025 |
| Coefficient on $r^{14}$ | 0 |
| Coefficient on $r^{16}$ | 0 |
| Aperture | Floating Aperture |
| Maximum Radius | 0.8 |
| Surface 4 | STANDARD |
| Surface 5 | STANDARD           CGH GLASS SUB |
| Aperture | Floating Aperture |
| Maximum Radius | 3 |
| Surface 6 | BINARY_2           CGH |
| Diffraction Order | 1 |
| Coefficient on $r^2$ | 0 |
| Coefficient on $r^4$ | 0 |
| Coefficient on $r^6$ | 0 |
| Coefficient on $r^8$ | 0 |
| Coefficient on $r^{10}$ | 0 |
| Coefficient on $r^{12}$ | 0 |
| Coefficient on $r^{14}$ | 0 |
| Coefficient on $r^{16}$ | 0 |

TABLES 4.3-continued

ZEMAX Prescription Data for the System of FIG. 4A

| | | |
|---|---|---|
| Maximum term # | 3 | |
| Normalization Radius | 2.62 | |
| Coefficient on $r^2$ | 1080.9255 | |
| Coefficient on $r^4$ | −44.1749 | |
| Coefficient on $r^6$ | 6.4408991 | |
| Aperture | Floating Aperture | |
| Maximum Radius | 2.7 | |
| Surface 7 | STANDARD | |
| Surface 8 | STANDARD REFERENCE SPHERE | |
| Aperture | Floating Aperture | |
| Maximum Radius | 5 | |
| Surface 9 | STANDARD | |
| Surface 10 | PARAXIAL | |
| Focal length | 75 | |
| OPD Mode | 0 | |
| Surface IMA | STANDARD | |

MULTI-CONFIGURATION DATA:

Configuration 1:

| | | | |
|---|---|---|---|
| 1 | Param 0 | 6 | 0 |
| 2 | Stop Surf | | 6 |
| 3 | Param 1 | 1 | 5 |
| 4 | Model Nd | 2 | 1 |
| 5 | Comment | | |

Configuration 2:

| | | | |
|---|---|---|---|
| 1 | Param 0 | 6 | 1 |
| 2 | Stop Surf | | 3 |
| 3 | Param 1 | 1 | 0 |
| 4 | Model Nd | 2 | 0 |
| 5 | Comment | | |

INDEX OF REFRACTION DATA:

| Surf | Glass | Temp | Pres | 0.632800 |
|---|---|---|---|---|
| 0 | | 20.00 | 1.00 | 1.00000000 |
| 1 | | 20.00 | 1.00 | 1.00000000 |
| 2 | <MODEL> | 20.00 | 1.00 | 0.00000000 |
| 3 | | 20.00 | 1.00 | 1.00000000 |
| 4 | | 20.00 | 1.00 | 1.00000000 |
| 5 | SILICA | 20.00 | 1.00 | 1.45701793 source: Handbook of Optics Vol. II |
| 6 | | 20.00 | 1.00 | 1.00000000 |
| 7 | | 20.00 | 1.00 | 1.00000000 |
| 8 | BK7 | 20.00 | 1.00 | 1.51508920 |
| 9 | | 20.00 | 1.00 | 1.00000000 |
| 10 | | 20.00 | 1.00 | 1.00000000 |
| 11 | | 20.00 | 1.00 | 1.00000000 |

System Temperature: 20.0000 Celsius
System Pressure: 1.0000 Atmospheres
Absolute air index: 1.000272 at wavelength 0.632800 μm
Index data is relative to air at the system temperature and pressure.
Wavelengths are measured in air at the system temperature and pressure.

THERMAL COEFFICIENT OF EXPANSION DATA:

| Surf | Glass | TCE *10E-6 |
|---|---|---|
| 0 | | 0.00000000 |
| 1 | | 0.00000000 |
| 2 | <MODEL> | 0.00000000 |
| 3 | | 0.00000000 |
| 4 | | 0.00000000 |
| 5 | SILICA | 0.51000000 source: Handbook of Optics Vol. II |
| 6 | | 0.00000000 |
| 7 | | 0.00000000 |
| 8 | BK7 | 7.10000000 |
| 9 | | 0.00000000 |
| 10 | | 0.00000000 |
| 11 | | 0.00000000 |

It is appreciated, therefore, that according to the idea of the invention, the interferometric set-up (such as that shown in FIG. 1) for measuring an aspherical and/or free-form surface of an optical component, is a common-path interferometer, in which both the reference and the test beams are co-located in space and travel co-linearly and, therefore are affected equally by the ambient environment through which they propagate (with exception of the CGH 134, which both of the beams traverse). Therefore, as a skilled artisan will readily appreciate, such common-path interferometer is less sensitive to environmental factors (such as vibration(s), thermal gradients, and air turbulence, for example) than a conventional interferometer that has two spatially-distinct test and reference arms. This provides a clear operational advantage over the use, for the stated purpose, of other interferometric configurations such as, for example, Twyman Green or Fizeau interferometers.

In further reference to FIG. 1, the visibility of fringes formed, as a result of interference of the test and reference beams 160, 164, at the detector 150 (referred to herein as fringe visibility of fringe contrast) depends on relative levels of irradiances, $I_T$ and $I_R$, of these beams according to:

$$\text{Fringe Visibility} = \frac{2\sqrt{I_R I_T}}{I_R + I_T}$$

To optimize fringe visibility, the diffractive element 134 of an embodiment could be designed such as to minimize the difference of irradiances of the reference and test beams by tuning the diffraction efficiency of the two diffraction orders corresponding to the test and reference beam, in order to optimize the fringe visibility at the plane of the detector.

Figure 5A:
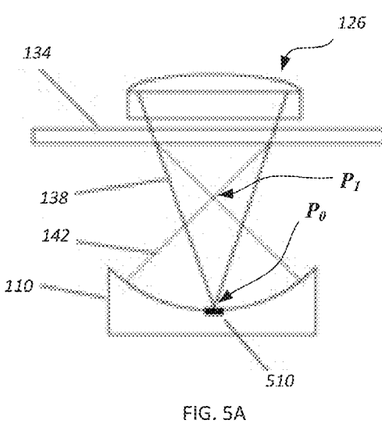
Figure 5B:
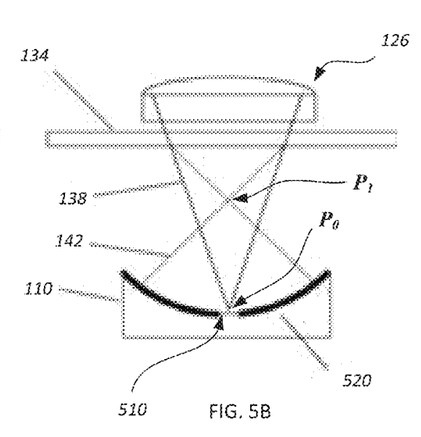

In cases when the operation of the CGH leads diffracts the test beam and the reference with significantly different diffraction efficiencies, and when such difference or discrepancy in diffraction efficiencies cannot be reduced to an operationally acceptable value, the power in at least one of the test and reference beams may be appropriately adjusted after interaction of these beams with the CGH, to produce interference fringes with sufficiently high visibility. One possible approach to achieve such adjustment may manifest in modifying the reflectance characteristic of the SUT 110A over an area where the beam of interest reflects off of the test surface. The purpose of such modification is to change a spatial distribution of reflectance characteristic(s) of the SUT such that a first radiant power (in the beam of a particular diffraction order that has been reflected by the SUT) is substantially balanced with or equal to the second radiant power (in the beam of a different diffraction order that has been reflected by the SUT). For example, the reflectance of the SUT 110A can be appropriately reduced in the area 510 around the point $P_0$, as shown in FIG. 5A, to reduce the irradiance of the diffracted zeroth order reference beam 138 upon reflection from the area 510 of the SUT 110A. This can be achieved by, for example, coating the area 510 with partially absorbing material. (Alternatively or in addition, the area of the SUT 110A that is located outside the area 510 can be coated with a reflectance-boosting coating to increase the SUT's reflectance value corresponding to the first diffraction order beam 142). In a different situation, where the test beam is stronger than the reference beam, an appropriate coating can be applied to the surface 110A in the area 520 defined as the area of the SUT 110A with exception of a small area 510 that surrounds the point $P_0$ to which the zeroth diffraction order beam (in the example of FIG. 1) converges, as shown in FIG. 5B. It is appreciated that the area 520 is located outside of the central axially-located area 510 and, in some cases, encircles or circumscribes the area 510. The precise dimensions of the areas 510, 520 generally depend on the spot size of the zeroth order reference beam, which is determined by the wavelength of light and F-number (F/#) of the beam at SUT 110A (the latter can be readily assessed by a person of ordinary skill in the art).

Phase shifting methodology is known in the art to be a powerful method for analysis of fringe patterns and surface profile of the test surface based on such analysis. For embodiments of the present invention, phase shifting can be implemented by using a tunable CGH as a diffractive element 134. A tunable CGH can introduce variable amount of phase difference between the test and reference beam wavefronts. For example, the tunable CGH can be programmed and/or governed with the control unit 170 (as shown with a dashed arrow 172 of FIG. 1) to change the phase corresponding to the test beam relative to the that of the reference beam by any specified amount (such as 2π radians, for example) in multiple discrete intervals (such as four equal steps, for example).

In accordance with examples of embodiments, described with reference to FIGS. 1, 2A, 3A, 4A, 5A, 5B and corresponding data tables, a common path interferometer is provided equipped with the CGH and advantageously suited for a reduced-sensitivity (as compared to conventional interferometers) to environment conditions measurement of a non-spherical surface based on interference between two different diffractive order beams of light produced by the CGH. While specific values and/or parameters of optical elements and geometry of the set-ups chosen for such embodiments are recited, it is to be understood that, within the scope of the invention, the values of any of such parameters may vary over wide ranges to suit different applications.

The description above referred to using 0th order and 1st order for the reference and test beam respectively. While a skilled artisan will readily appreciate that many other combinations of two diffraction orders can be used to effectuate the SUT-testing according to the presented idea, in practice it may be preferred to use those diffraction orders for which the device of the invention has high light throughput.

Figure 6:
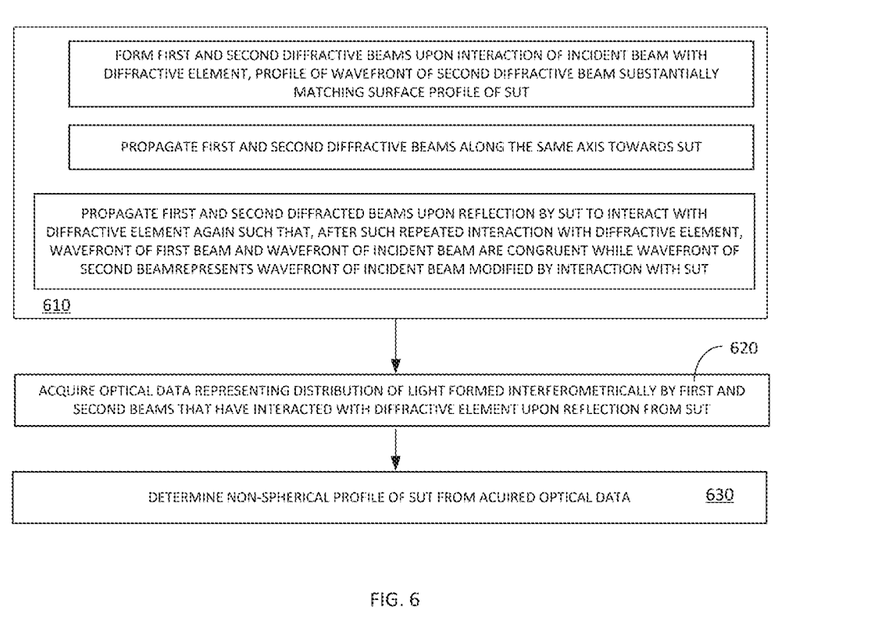
FIG. 6 is a flow chart schematically showing major steps of a method for testing an aspherical surface according to an embodiment of the invention.

In accordance with a related embodiment, a method for testing of a non-spherical surface is provided with the use of a the formation of diffraction test and reference beams according to the idea of the invention and common-path propagation of such beams through a diffractive element for the second time prior to forming an interference image at a detector. According to the method, the major steps of which are schematically shown in FIG. 6, at step 610 the first and second beams of light, formed by a diffractive element from an input beam of light that has a corresponding wavefront and that is incident onto the diffractive element, are reflected from the SUT to co-axially and in a spatially-overlapping fashion propagate towards the diffractive element and interact with the diffractive element for the second time. The diffractive element is structured such that the wavefront of the first reflected beam that has interacted with the diffractive element for the second time and the wavefront of the incident beam are substantially congruent, while the wavefront of the second reflected beam represents the wavefront of the input beam modified by parameters representing the SUT. At step 620, optical data is acquired from an interferometric image formed by the wavefronts of the first and second beams at the detector. At step 630, a non-spheric profile of the SUT is extracted from the acquired optical data with the specifically programmed computer processor.

Any of the operation of the interferometric set-up, CGH, light source, and determination of the aspheric profile of the SUT based on the so-acquired optical data generally would include the use of a data-processing electronic circuitry (interchangeably referred to herein as processor) controlled by instructions stored in a memory. The memory may be random access memory (RAM), read-only memory (ROM), flash memory or any other memory, or combination thereof, suitable for storing control software or other instructions and data. Those skilled in the art should readily appreciate that functions, operations, decisions, etc. pertaining to the operation of the processor may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described examples embodiments, it will be understood by those of ordinary skill in the art that modifications to, and variations of, the illustrated embodiments may be made without departing from the inventive concepts disclosed herein. For example, a skilled artisan will appreciate how an optical scheme of FIG. 1 can be modified to accommodate the operation of the diffractive element 134 in reflection of light 114 instead of transmission, or that a particular implementation of the CGH may be structured to generate only two required diffraction order beams from the incident beam.

Disclosed aspects, or portions of these aspects, may be combined in ways not listed above. The invention should not be viewed as being limited to the disclosed embodiment(s).

What is claimed is:

1. A method for interferometric testing of a non-spherical surface (SUT), the method comprising:
   reflecting first and second beams of light, formed by a diffractive element from an input beam of light having an input beam wavefront and incident onto the diffractive element along an optical axis, from the SUT to form first and second reflected beams such that
      characteristics of a first wavefront corresponding to said first reflected beam are the same as characteristics of the input beam wavefront, and
      characteristics of a second wavefront corresponding to said second reflected beam include characteristics of the input beam wavefront that have been modified by interaction of said input beam with the SUT;
   modifying a spatial distribution of reflectivity of the SUT to independently attenuate the first and second reflected beams; and
   determining, with the use of a control unit that includes data-processing circuitry, a non-spheric profile of the SUT based on optical data, said optical data derived from a distribution of irradiance that is interferometrically formed by said first and second reflected beams upon co-axial propagation thereof.

2. A method according to claim 1, said reflecting includes reflecting first and second beams that respectively correspond to two different diffraction orders formed by said diffractive element from the input beam.

3. A method according to claim 1, wherein said reflecting includes reflecting the first beam from the SUT in a cat's eye configuration and reflecting the second beam from the SUT in a confocal configuration.

4. A method according to claim 1, wherein said reflecting includes reflecting said first beam that converges towards a first point of intersection of the optical axis with the SUT and further includes reflecting said second beam that converges towards a second point located between the diffractive element and the first point.

5. A method according to claim 1, wherein said reflecting includes reflecting said first beam that converges towards a first point of intersection of the optical axis with the SUT and further includes reflecting said second beam that converges towards a second point, the first point is located between the diffractive element and the second point.

6. A method according claim 1, wherein said reflecting includes reflecting said first beam having a spherical wavefront and further includes reflecting said second beam having a wavefront a profile of which corresponds to the profile of the SUT.

7. A method according to claim 1, wherein said reflecting includes propagating said first and second beams through the diffractive element after said first and second beams have interacted with the SUT.

8. A method according to claim 1, wherein said reflecting includes forming said first and second beams in transmission of the input beam through the diffractive element.

9. A method according to claim 1, wherein said reflecting includes forming said first and second beams in reflection of the input beam from the diffractive element.

10. A method according to claim 1, wherein said determining includes introducing a phase shift between the first and second reflected beams with the diffractive element optical properties of which are tunable.

11. A method according to claim 1, further comprising tuning the diffractive element with the control unit to minimize a difference between diffraction efficiencies respectively corresponding to a formation of the first and second beams to optimize visibility of said distribution of irradiance.

12. A method according to claim 1, wherein said determining includes determining based on optical data acquired with the use of an optical detector.

13. A method according to claim 1, wherein said modifying includes modifying a spatial distribution of reflectivity of the SUT to substantially match radiant power of the first reflected beam with radiant power of the second reflected beam.

14. A method according to claim 1, further comprising coating of an area of the SUT with a layer of material such that a first area around a first point at the SUT has a first reflectivity and a second area located outside the first area at the SUT has a second reflectivity,
   wherein the first point being a point towards which the first beam converges, and wherein the first and second reflectivities being different from one another.

15. A common-path interferometer system having an axis and comprising:
   a diffractive element positioned in the path of an input beam of light incident thereon from an object space, said diffractive element structured (i) to form a first beam of light upon interaction of the diffractive element with said input beam, said first beam of light corresponding to a first chosen diffraction order; and (ii) to form a second beam of light upon interaction of the diffractive element with said input beam, said second beam of light corresponding to a second chosen diffraction order;

such that said first beam of light converges to a first point on the axis and said second beam of light converges towards a second point on the axis, the first point and second point being different; and a reflector having a reflecting surface positioned perpendicularly to the axis and passing through the second point wherein said second beam, that has been reflected by said reflector, forms a reference bean of said interferometer system; and wherein said first beam, that has been reflected by said reflector, forms a test beam of said interferometer system.

16. A common-path interferometer system according to claim 15, wherein the first and second beams propagate along an axis and said first and second points are located on said axis.

17. A common-path interferometer system according to claim 15, wherein, when said reflecting surface is a non-spherical surface, the diffractive element is structured to produce, in transmission of the input beam therethrough, the first beam having a first wavefront that is spatially matched to said non-spherical surface and the second beam having a second wavefront that is spherical.

18. A common-path interferometer system according to claim 15, wherein said diffractive element operates in transmission.

19. A common-path interferometer system according to claim 15, wherein said diffractive element operates in reflection.

20. A common-path interferometer system according to claim 15, further comprising an optical detector positioned to intersect the test and reference beams and to produce an output, the output being representative of interference fringes formed by the first and second beams at a surface thereof; and a control unit in operable communication with the optical detector and including data-processing circuitry and tangible, non-transitory medium containing program code thereon which, when executed by said data-processing circuitry, governs said circuitry to determine a profile of a wavefront of the test beam based on the output.

21. A common-path interferometer system according to claim 15, wherein the diffractive element includes a computer generated hologram.

* * * * *